United States Patent [19]

Buskirk et al.

[11] Patent Number: 4,872,027

[45] Date of Patent: Oct. 3, 1989

[54] PRINTER HAVING IDENTIFIABLE INTERCHANGEABLE HEADS

[75] Inventors: William A. Buskirk, Albany; Carl J. Landsness, Corvallis, both of Oreg.; John D. Rhodes, Vancouver, Wash.

[73] Assignee: Hewlett-Packard Company, Palo Alto, Calif.

[21] Appl. No.: 116,093

[22] Filed: Nov. 3, 1987

[51] Int. Cl.[4] .......................... G01D 15/16; B41J 3/04

[52] U.S. Cl. .......................... 346/140 R; 346/139 C; 400/175

[58] Field of Search .......................... 346/140, 139 C; 400/175, 126

[56] References Cited

U.S. PATENT DOCUMENTS

| | | | |
|---|---|---|---|
| 4,396,923 | 8/1983 | Noda | 346/76 PH |
| 4,554,559 | 11/1985 | Heath | 346/76 PH |
| 4,577,200 | 3/1986 | Rix | 346/140 |
| 4,741,634 | 5/1988 | Nozaki | 400/175 X |
| 4,771,295 | 9/1988 | Baker | 346/140 X |
| 4,774,529 | 9/1988 | Paranjpe | 346/140 |
| 4,803,500 | 2/1989 | Milbrandt | 346/140 |
| 4,812,859 | 3/1989 | Chan | 346/140 |

FOREIGN PATENT DOCUMENTS 0206662 10/1985 Japan .

*Primary Examiner*—Joseph W. Hartary

*Attorney, Agent, or Firm*—William J. Bethurum

[57] ABSTRACT

A dot-matrix printer is provided with different types of printheads which are interchangeably attachable to the printer carriage. The heads are provided with individual codes which are read by the printer control system and used to reconfigure its control function to suit the control requirements of the identified head. Such a system may include a microprocessor responsive to individual sets of instructions or programs providing new and different processing capabilities for printing control in response to the insertion of a new printhead.

6 Claims, 5 Drawing Sheets

| | | ID PAD #2 (I2) | | |
|---|---|---|---|---|
| | | R48 | OPEN | R50 |
| ID PAD #1 (I1) | R47 | | MULTIDROP SINGLE COLOR | SINGLE COLOR |
| | OPEN | | | |
| | R49 | SINGLE DROP SINGLE COLOR | MULTIDROP MULTICOLOR | MULTICOLOR |

PRINTER HAVING IDENTIFIABLE INTERCHANGEABLE HEADS

BACKGROUND OF THE INVENTION

1. Field of the Invention

This invention relates to printers particularly dot-matrix types of printers. More particularly this invention relates to drop-on-demand types of dot-matrix printers, such as thermal inkjet printers in which provision is made for interchanging and identifying the printheads for the purpose of producing text or graphics in different colors and/or differing ink dot densities, sizes, for example.

2. Description of the Related Art

Inkjet printheads are used in printers and plotters. These include thermal and piezoelectric types of heads for expelling ink. The term printer and printhead as used herein is used as a term of convenience and is not intended to exclude the other types of recording such as plotting.

Thermal inkjet printers are described in the Hewlett-Packard Journal, May 1985, Volume 36, No. 5, which is included herein in its entirety by reference thereto. The production of ink drops by thermal exitation means is described in detail in terms of a specific implementation including a disposable head which could be replaced by another similar head.

As noted hereinabove there are a number of reasons for interchanging heads of different types, for example, black ink is used in most printing applications but there is a developing need for the use of colored inks in printing text and graphics. Heretofore printers having heads designed for single color printing have not been retrofited with color heads which may be interchangably fitted into the printer carriage designed for the single color head because of differing requirements resulting from printhead body configurations, ususally larger for accommodating several colors of ink, nozzle spacing and grouping, and control requirements to name a few. While multicolor heads can be provided with a chamber for black ink, where a printer is predominately used for black text or graphics, a supply of black ink in a multicolor head fitting in the printer carriage of an all black or other single color head, is limited in volume. Thus interchangeable single color/multicolor heads in a printer increase the utility of an otherwise single color printer or recorder.

Although U.S. Pat. Nos. 4,511,907; 4,540,996; 4,611,219; 4,630,076 and 4,631,548 are directed to multicolor inkjet printers, none appear to suggest or teach configurations for a multicolor head which is interchangeable with a single color head in a single color printer. Likewise, none of these patents, lacking the concept of interchangability, provide any arrangement whereby interchangeable heads each carry an identifying code for which specific printing controls are required. Thus these patents are related to this invention only in the sense of the use of individual nozzle groups for differing colors and in the employment of dot-matrix techniques for printing, but interchangability of the heads for any purpose together with their individual identities for control purposes, appear to be lacking.

Still further there appears to be no reference in the prior art with regard to the interchangability of heads in a particular printer to provide different dot densities, different drop volumes or combinations of such factors in single color and multicolor printheads.

SUMMARY OF THE INVENTION

The present invention is directed to a printer having interchangable heads each of which is provided with a specific code which identifies the type of head that has been mounted on the printer carriage. The printer reads this code and provides a control for controlling the head in printing text or graphics according to the requirements for that particular head. In one practical embodiment of this invention applied to thermal inkjet printheads extra electrical contact pads are provided on the resistor network which fires the nozzles of the head. These contact pads are selectively electrically connected in the resistor network which fires the individual nozzles in several unique configurations each of which defines a specific head such as single color, multicolor, single drop, multiple drop and so on. The code provided by these unique configurations of the electrical pads is detectable by the printer so that the type of head which is inserted is determined with certainty and the printer provides the appropriate control of the head during printing. In this embodiment, the individual electrical pads are selectively connected (or not connected) to the resistor circuits or circuit traces. By individually toggeling the resistor lines at high or low voltage levels and detecting a voltage level shift on the lines associated with the extra contact pads, which are the head identity contact pads, a connection (or lack of connection) may be detected. With this implementation (connection or no connection), using two extra pads, nine unique connections may be made to identify the particular head that is in the printer. Thus multi-drop single color, multi-drop multicolor, single drop single color, single drop multicolor, heads of differing drop sizes, colors, etc., may be individually identified.

While it is convenient in a thermal inkjet type of printhead to implement the code for a particular head in the resistor network for firing the individual nozzles, the code may be implemented on the head by other means including electrical pad configurations which are not associated with the resistor network, projections or depressions at convenient locations on the body of the printhead which can be sensed by switches on the printer carriage, a conventional bar code on the body of the printhead which can be read by a bar code reader, or reflecting strips on the body of the printhead which can be detected by light sensitive devices on the printer carriage. This listing of alternatives is by no means exhaustive or intended to be exhaustive of arrangements for providing an identifiable code associated with a specific head in a printer.

The utility of this invention in enlarging the printing capabilities of the printer is apparent from the single color/multicolor enlargement in printing scope alone, as discussed above. This invention provides a printer which is capable of reconfiguring its control capabilities according to the code which is sensed when the different types of heads are mounted on the carriage. By this expedient, new and different printing capabilities are provided with the insertion of a new head. Using a multiprocessor in the printer control system for processing input defined by the identity code of the printhead, reconfigured control potentials are achieved in the selection, for example, of instructions or instruction changes resident in a host controller for the microprocessor.

DESCRIPTION OF THE PREFERRED EMBODIMENT

Figure 1:
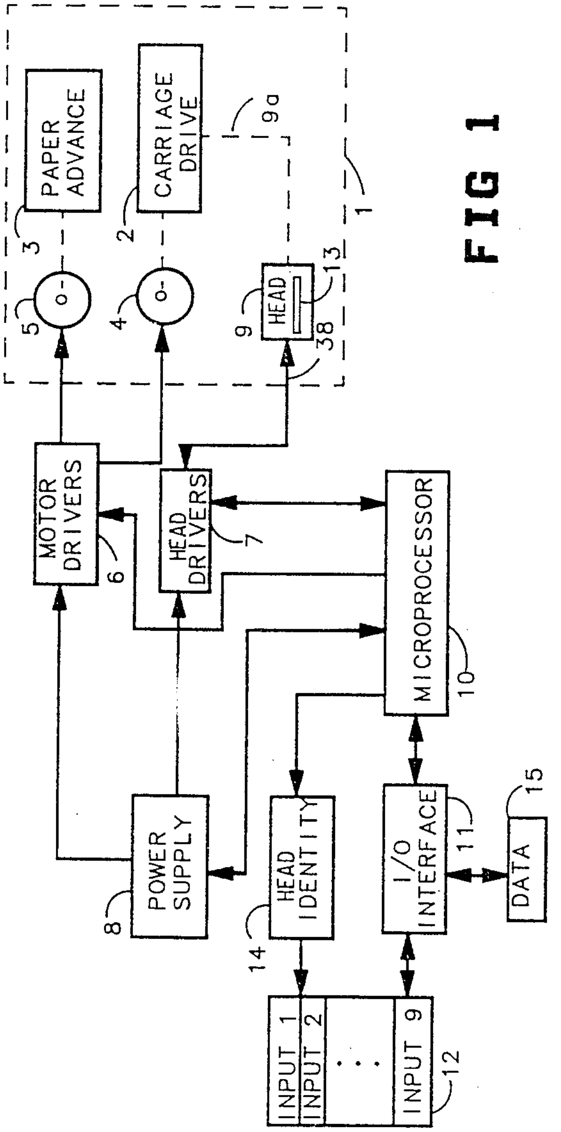
FIG. 1 is a block diagram of a thermal inkjet printer system.

The block diagram of FIG. 1 illustrate one type of printer control system. Such a system comprises a printer (shown here schematically) having a chassis 1 on which a carriage 2 is slidable mounted for movement from one side to the other of paper in a paper advance mechanism 3 mounted in the chassis. The paper advance mechanism 3 moves the paper in an orthogonal direction with respect to the carriage. A carriage motor 4 and a paper advance motor 5 drive the carriage and advance the paper under the control of motor drivers 6 supplied with power from a power supply 8. Printhead drivers 7, also supplied with power from the power supply 8, individually energize the ink drop firing resistors of a head 9 which is secured on the printer carriage 4 by means of a head attachment mechanism 9*a*. The ink drop firing resistors are not shown at this point. The system is controlled by a microprocessor 10 which receives data and instructions via an input-output interface 11 coupled to an instruction and data source 12 for the system. Head identification code 13 on the head 9, which may be a part of the head ink drop firing resistor network or some other identification, is detected and the head identification is used by the head identity circuit 14 to select one of a plurality of inputs associated with the particular head at the input source 12, to provide instructions to the microprocessor 10 for controlling that particular head. Data for the particular text or graphics to be printed by the head placed in the printer may be part of the selected input or may be separately programmed via the inputoutput interface 11 by a data source 15 where such provision is convenient.

In instances where head identification code 13 comprises a part of the resistor network which fires the droplets from the individual nozzles of the head, the head drivers under the control of the microprocessor may interrogate the specific resistor circuits associated with the identification contact pads to obtain the head identification code. This is done under the control of the microprocessor in which case the microprocessor, interpreting the signals derived from the specific code, provides a head identification signal which may be coupled to the separate head identity circuit 14, or used directly, to select one of the inputs, Input 1-Input 9, from the instruction source 12, which may also include data for programming the microprocessor in its control of the printhead drivers as well as instructions for controlling the level of input of the power supply 8, where needed, to properly control that particular head.

Otherwise the microprocessor may look to a code derived from switches, from bar codes, or light reflective devices, for information identifying the particular head.

Figure 2:
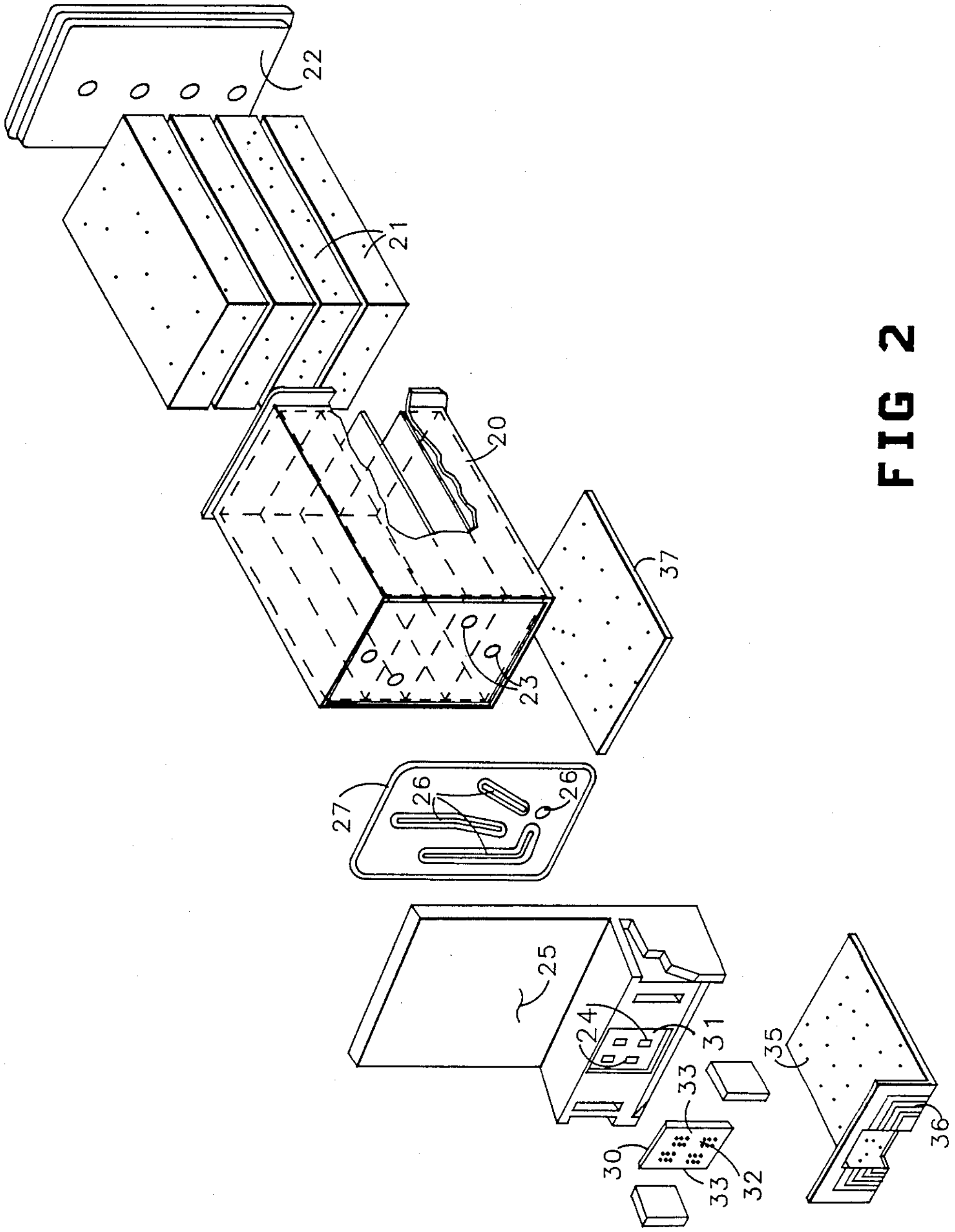
FIG. 2 is an exploded perspective view of one type of a thermal inkjet printhead which is employable in practicing this invention.
Figure 5:
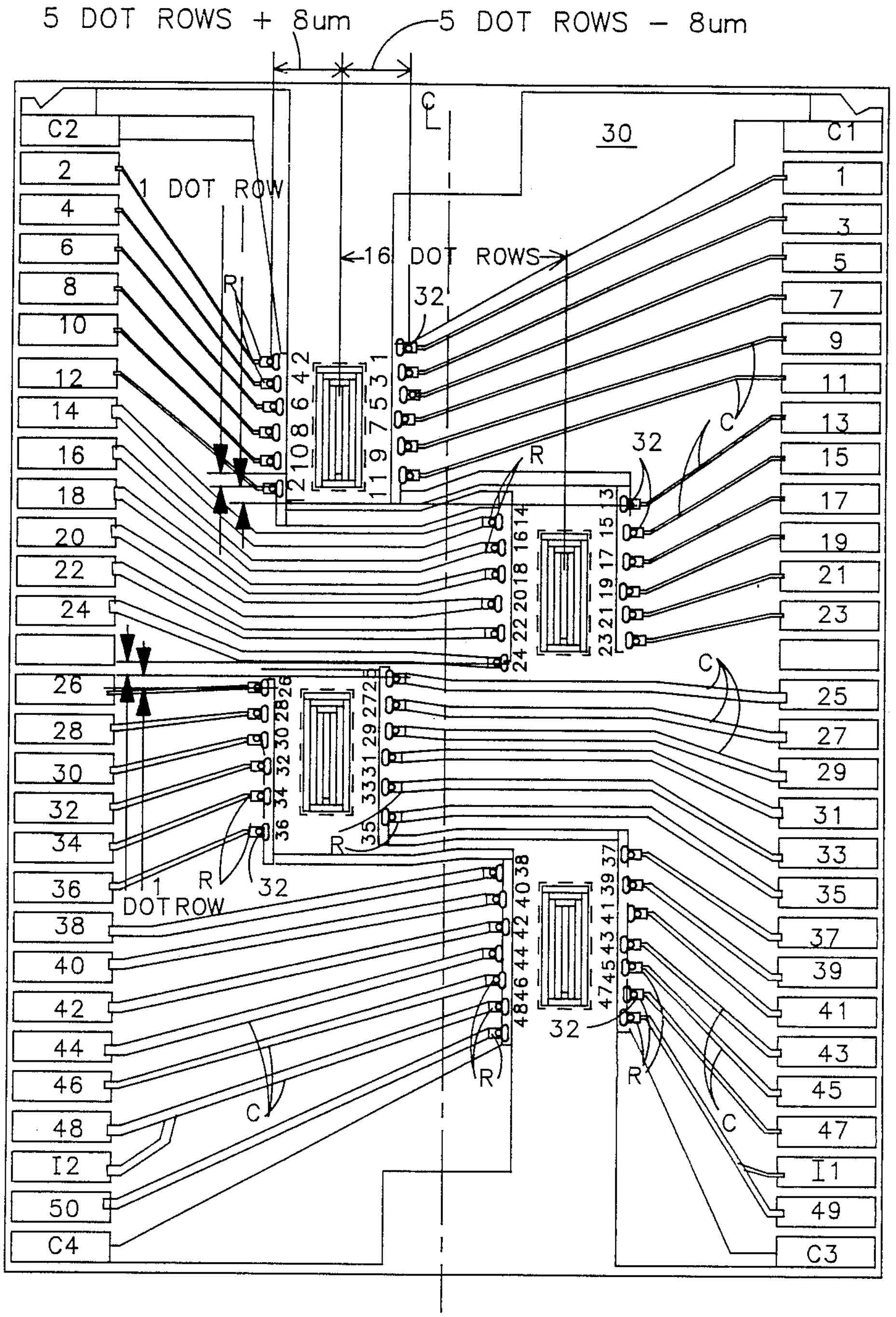
FIG. 5 illustrates the layout of the nozzle or orifice plate of FIG. 2 showing the resistor networks.

One type of head which may be employed in practicing this invention is illustrated in the exploded perspective view of FIG. 2. This is a thermal inkjet type of printhead having a plurality of chambers individually isolated from one another for containing different colors of ink. The head comprises a body 20 having four individual chambers each of which receives a block of foam 21 saturated with ink of a selected color. A back plate 22 seals the body 20 and the individual chambers. Individual holes 23 in the front face of the body 20 provide communication for each chamber with individual openings 24 in a front plate 25 via four openings 26 in a gasket 27 which seals the front plate 25 to the body 20 and provides isolated communication of each chamber with a selected one of the openings 24 through the front plate 25. A nozzle plate 30 which fits into a cavity 31 in the front of the front plate 25 is provided with groups of nozzles 32 aligned with the openings 24 in the front plate. Contact pads 33 along the opposite side edges of the nozzle plate 30 provide connection via circuit traces within the individual resistors at the individual nozzles. These details are shown in FIG. 5. The individual contact pads 33 provide a means for selectively connecting electrical energy to the individual resistor circuits. Such connection is accomplished by means of a flexible circuit 35 provided with circuit traces 36 terminating in contact pads along the back of the side edges of the slot in the flexible circuit. The pads are not visible here. This slot straddles the nozzle plate 30 in assembled position so that the contact pads on the back face of the flexible circuit engage the contact pads 33 on the nozzle plate. The flexible circuit in assembled position extends beneath the body 20 where it is secured by pressure sensitive adhesive 37, or by other means, to the bottom side of the body 20.

Figure 3:
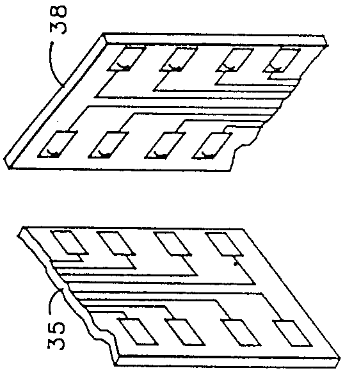
FIG. 3 is a schematic fragment of the end of a flexible circuit in FIG. 2 which engages the pickup end of a flexible circuit on the printer carriage, showing how the electrical connections are made.

There are electrical pad connections at both ends of the flexible circuit traces 36. One set of electrical contact pads, as stated above, is on the back side of the flexible circuit 35 on the opposite sides of the slot therein, each of which engages a circuit trace in the flexible circuit. The ends of the circuit traces at the opposite end of the flexible circuit 35 are terminated in contact pads on the bottom side of the flexible circuit 35, as viewed. FIG. 3 illustrates such typical connections. FIG. 3 is not intended to represent specific connection configurations on the flexible circuit 35, but is intended merely to indicate how these connections are made. A fragment of the flexible circuit 35 is shown on the left in FIG. 3 and may typically represent the contact pads on both ends of the flexible circuit 35. A second flexible circuit 38, also comprising circuit traces and contact pads, represents, for example, a flexable circuit end on the printer carriage 2 which engages the end of the flexible circuit 35 beneath the body 20, to provide electrical connection between the printhead 9 on the carriage 2 and printer drivers 7 (FIG. 1) which are located off the carriage. The contact pads on the flexible circuit 38 are provided with projecting dimples to provide positive engagement with the contact pads on the confronting section of the flexible circuit 35. Similar contacts may be provided between the contacts on the flexible circuit 35 and the contact pads 33 on the nozzle plate 30. Such specific connections are illustrative and not limiting.

Figure 4:
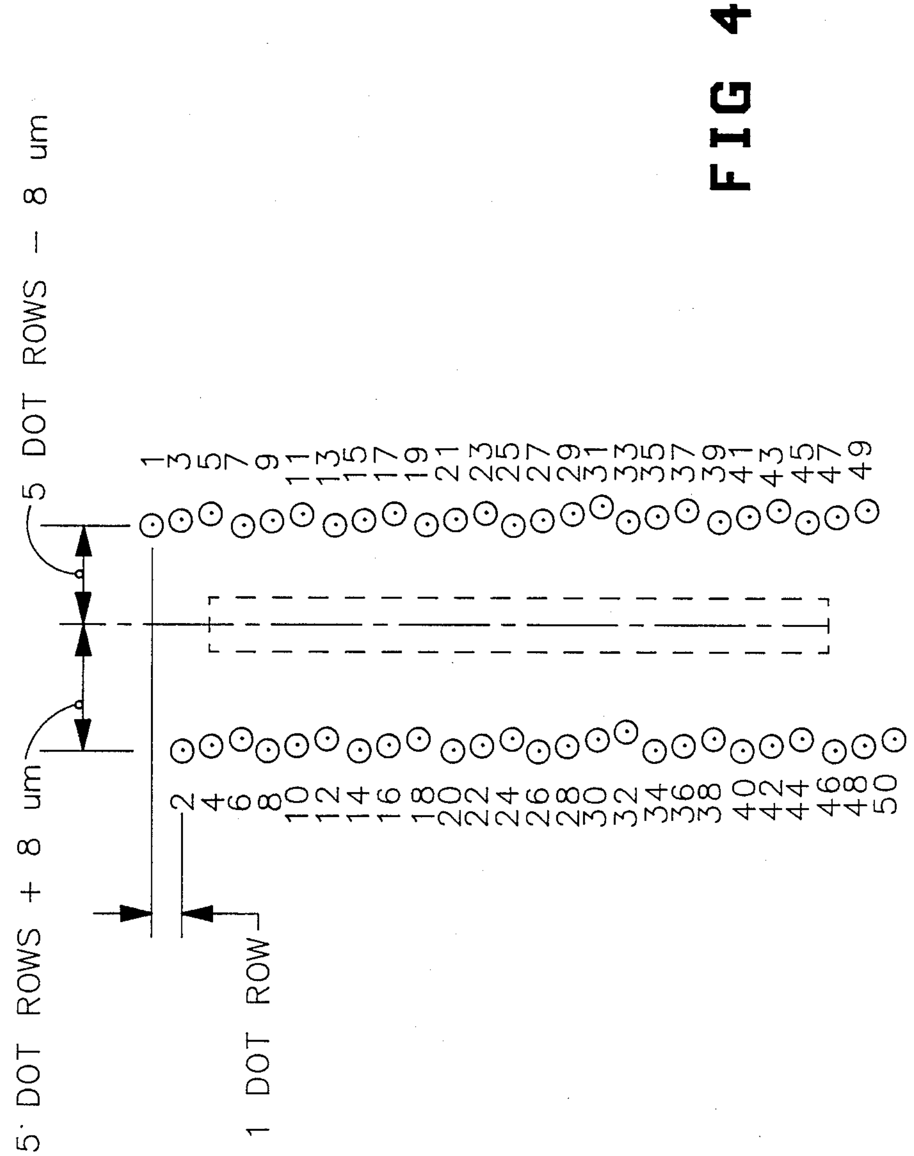
FIG. 4 illustrates the layout or the format of the nozzles of a single color head of a type that may be employed in practicing this invention.

Simplifications in the control system firmware and programming are realized if formating of the nozzle configurations on the different types of pens are similar, for example, nozzle formats on a multicolor head being similar to the nozzle format on a single color head. FIG. 4 illustrates the nozzle format for one type of single color head. The nozzle plate of FIG. 4 comprises two columns of nozzles there being 25 nozzles in each column. The nozzles in each column are arranged in staggered groups of 3 as seen. The nozzles in the right column which are odd numbered nozzles 1–49 are displaced vertically as viewed with respect to the nozzles in the left column which are the even numbered nozzles, 2–50, by one-half the distance between the nozzles in the columns.

TABLE I

| FIRING SEQUENCE | SHIFT OFFSET (1PP) 0 | SHIFT OFFSET (1PP) 10 | TIMING OFFSET (UM) |
|---|---|---|---|
| 0 | 20,46 | 19,45 | 0.0 |
| 1 | 14,40 | 13,39 | 2.5 |
| 2 | 8,34 | 7,33 | 5.5 |
| 3 | 2,28 | 1,27 | 8.0 |
| 4 | 22,48 | 21,47 | 11.0 |
| 5 | 16,42 | 15,41 | 13.5 |
| 6 | 10,36 | 9,35 | 16.5 |
| 7 | 4,30 | 3,29 | 19.0 |
| 8 | 24,50 | 23,49 | 22.0 |
| 9 | 18,44 | 17,43 | 24.5 |
| 10 | 12,38 | 11,37 | 27.5 |
| 11 | 6,32 | 5,31 | 30.0 |
| 12 | 26 | 25 | 33.0 |

Table I illustrates the firing sequence of the resistors associated with each of the nozzles of FIG. 4. The location of these resistors will be apparent from FIG. 5 discussed hereinafter. The resistors on the head must be fired in a particular order to minimize cross talk. The location of the nozzles is set so that that dots will all be fired in the same vertical column when there is a constant scan or printing velocity. The dot firing sequence and relative nozzle locations in microns for a specific example are specified in Table I. When printing left to right the indicated sequence is used. When printing right to left the resistors are fired in the reverse sequence.

The nozzle format of FIG. 4 is retained in the individual nozzle groups of the printhead 30 as seen in FIG. 5. In effect, the nozzle column of FIG. 4 is divided by 4. Each nozzle group comprises 12 nozzles arranged in 2 columns of 6 having the dot row spacing between corresponding nozzles of respective rows and having the same column spacings as those of the single color head. Since this multicolor head has the same continuous dot per inch spacing with four color capability as the single color head all of the single color printer text and graphics control characteristics are utilized. Only firmware and software require color capability. Formatting is required to provide the dot stagger offset between the nozzle groups. Thus within each nozzle group the ink drop firing sequence is the same as that of the single color head. FIG. 5 illustrates at an enlarged scale the layout of the nozzle plate 30 of FIG. 2. Only the location of the nozzles 32 of the nozzle plate 30 are shown in this FIG. 5, since the figure is already highly detailed. These nozzles 32 are shown in their individual locations over the individual resistors R in the respective nozzle groups. The individual resistors R are connected by circuit traces C to the respective contact pads. The even numbered contact pads 2 through 50 appear on the left side of FIG. 5 and the odd numbered contact pads 1 through 49 are shown on the right side of the substrate of FIG. 5. The common contact pads C1, C2, C3 and C4 for this substrate circuit system appear in the four corners of the substrate.

Only 48 of the 50 nozzles of FIG. 4 are needed in developing the nozzle and circuit format of the nozzle plate 30 of FIG. 5. In this situation the nozzles 49 and 50 are not used, although they still appear on the nozzle plate as seen. This layout retains the firing sequence of the single color head with respect to the nozzles in the individual color groups. Table II below shows the firing sequence for the nozzles and resistors based upon the development of the nozzle plate of FIG. 5 and shows the shift offset required in dot rows or logical print positions in firing the individual resistors.

TABLE II

| FIRING SEQUENCE | 0 | | 10 | | 16 | | 26 | | TIMING OFFSET (UM) |
|---|---|---|---|---|---|---|---|---|---|
| 0 | | | | | 20 | 44 | 19 | 43 | 0 |
| 1 | | | | | 14 | 38 | 13 | 37 | 2.5 |
| 2 | 8 | 32 | 7 | 31 | | | | | 5.5 |
| 3 | 2 | 36 | 1 | 25 | | | | | 8.0 |
| 4 | | | | | 22 | 46 | 21 | 45 | 11.0 |
| 5 | | | | | 16 | 40 | 15 | 39 | 13.5 |
| 6 | 10 | 36 | 9 | 35 | | | | | 16.5 |
| 7 | 4 | 28 | 3 | 27 | | | | | 19.0 |
| 8 | | | | | 24 | 48 | 23 | 47 | 22.0 |
| 9 | | | | | 18 | 42 | 17 | 41 | 24.5 |
| 10 | 12 | 36 | 11 | 35 | | | | | 27.5 |
| 11 | 6 | 30 | 5 | 29 | | | | | 30.0 |
| 12 | | | | | | | | | 33.0 |

Further and additional details with respect to nozzle formats for multicolor heads may be had by reference to a co-pending application of C. S. Chan, et al, Ser. No. 07/098/840 filed 9-17-87, now U.S. Pat. No. 4,812,859, entitled Multi-Chamber Ink Jet Recording Head for Color Use, assigned to the assignee of this invention and incorporated in its entirety in this application by reference thereto.

Although the approach described above in formatting the nozzles in a multicolor head provide simplications noted above with respect to the control system and its programming, such nozzle formatting is not essential in practicing this invention. One approach to providing individual codes for identifying individual heads is discussed in connection with FIG. 5. Similar considerations of course apply to other types of heads including resistor substrates 31 having individual circuit pads, circuit traces and resistors for firing the ink drops. This of course applies to the single color nozzle format of FIG. 4 except for the lateral displacement of the nozzles of the individual color groups as seen in FIG. 5.

In reference to FIG. 5 identification contact pads I1 and I2 are provided. The contact pad I1 is located between the contact pads 47 and 49 and the contact pad I2 is located between the contact pads 48 and 50. In these positions the contact pad I1 may be connected to contact pad 47 or 49 or it may be connected to neither. The contact pad I2 may be connected to the contact pad 48 or the contact pad 50 or it may be connected to neither. The actual physical location of the contact pads at the end of the flexible circuit 35 beneath the body 20 may be seen by referring to FIG. 6. Here the location of the common contact pads C1, C2, C3 and C4 at the end of the flexible circuit 35 are shown together with the locations of the individual contact pads 1 through 50. Note in FIG. 6 that the head identity contact pads I1 and I2 are located respectively between contact pads 47 and 49 for I1 and for I2 between contact pads 48 and 50.

Figures 6, 7:
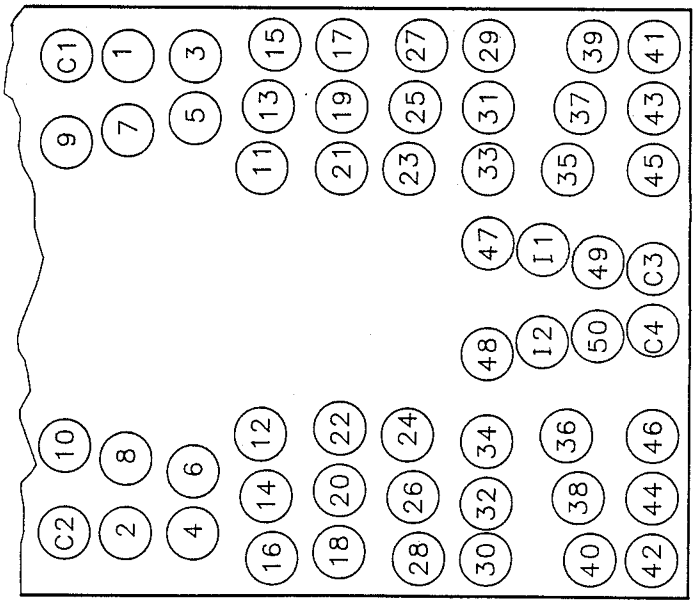
FIG. 6 shows the actual electrical pad layout of the end of the flexible circuit attached to the detector of the printer carriage.
FIG. 7 illustrates the logical concept of nine printhead identity codes, according to one specific embodiment of this invention.

In the circuit configurations described above there are nine possible code identities. These are depicted in FIG. 7. Only some of the heads or pens are identified with a particular code to demonstrate the principal. In practice the head needs to be interrogated only at the time that a printing operation is initiated. This therefore preferably occurs whether or not a head is replaced with a different head. By using this approach, there is certainty that a head is always properly identified and a head identification operation will therefore not be overlooked. Since head identification interrogation occurs and is terminated prior to the commencement of a printing operation, head identification in no way interferes with a printing operation. Additionally, although the resistor circuits 49 and 50 used in pen identification are not used in a printing operation associated with the specific resistor formatting of FIG. 5, this in no way interfers with the head identification function or with the printing function which follows.

In this connection it should be observed that the identification contact pads I1 and I2 may be located at any convenient location in the contact pad format of FIG. 5. Additionally more than one contact pad in each column of contact pads may be used to provide a higher number of identification codes.

While it is convenient to provide head identification codes using contact pads and connections forming part of the resistor circuit format, the means for generating the different identification codes is not necessarily a part of the resistor format, but as noted hereinabove may be separate and apart therefrom and need only be located in some convenient location on the printhead itself to be sensed electrically, magnetically, optically, or otherwise, in a way providing intelligence via the microprocessor, or otherwise, for selecting the proper printer system input for controlling the head in the printer.

We claim:

1. A dot matrix printer, comprising:

a movable printhead carriage;

a print media;

means for advancing said print media in a direction orthogonal to printhead carriage movement;

single color and multicolor thermal inkjet printheads;

a nozzle plate on each printhead having a plurality of nozzles and means for admitting ink to said nozzles;

each multicolor printhead having a nozzle group for each color of ink in the nozzle plate thereat, each nozzle group having the same nozzle format as the nozzles of a single color printhead but of a lesser number of nozzles than the number of nozzles for the single color of ink of the single color printhead;

means for mounting single color or multicolor printheads on said printhead carriage;

motor means for driving the printhead carriage to move the printhead thereon across said print media;

a resistor network on each printhead having a resistor at each nozzle, which resistor when energized heats and expels ink from the nozzle thereat;

a print control system for selectively energizing resistors of said resistor network of said printhead for printing on said print media during printhead carriage movement;

printhead identification means on each printhead comprising patterns of resistors forming part of said resistor network providing a unique code for each printhead;

detection means for energizing said patterns of resistors of said printhead identification means for providing electrical signal identifying a specific printhead; and means in said print control system responsive to said electronical signals for initiating operation of said print control system to selectively energize resistors at the nozzles of said specific printhead.

2. The dot matrix printer according to claim 1, in which:

said detection means energizes said patterns of resistors of said printhead identification means prior to printing.

3. The dot matrix printer according to claim 1, in which:

said means in said print control system selects input control for said print control system to provide the required control of said printhead.

4. Thermal inkjet printhead identification means, comprising;

a printhead body having at least one ink chamber;

a nozzle plate on said printhead body having nozzles communicating with said chamber;

a resistor network having an ink expulsion resistor at each nozzle;

contact pads in said resistor network and individual circuits connecting individual contact pads to individual resistors; and at least two printhead identification contact pads, each disposed between selected different pairs of said contact pads, and forming part of a printhead identification resistor network including at least two resistors for each printhead identification contact pad.

5. The thermal inkjet printhead according to claim 4, comprising;

means for coupling electrical energy at different times to each resistor at each printhead identification contact pad to determine by the resulting voltage response, if an electrical connection exists between a printhead identification resistor and the associated printhead identification contact pad.

6. The thermal inkjet printhead according to claim 5, comprising;

means for utilizing said voltage responses to provide a code identifying said thermal inkjet printhead.

* * * * *